United States Patent [19]

Cozewith et al.

[11] Patent Number: 4,874,820

[45] Date of Patent: Oct. 17, 1989

[54] COPOLYMER COMPOSITIONS CONTAINING A NARROW MWD COMPONENT AND PROCESS OF MAKING SAME

[75] Inventors: Charles Cozewith, Westfield; Shiaw Ju, Edison; Gary W. Verstrate, Matawan, all of N.J.

[73] Assignee: Exxon Research and Engineering Company, Linden, N.J.

[21] Appl. No.: 813,725

[22] Filed: Dec. 27, 1985

Related U.S. Application Data

[63] Continuation-in-part of Ser. No. 840,562, Dec. 26, 1985, which is a continuation-in-part of Ser. No. 681,951, Dec. 14, 1984, abandoned, which is a continuation-in-part of Ser. No. 504,582, Jun. 15, 1983, Pat. No. 4,540,753.

[51] Int. Cl.$^4$ .................. C08L 23/16; C08L 23/18; C08L 23/26
[52] U.S. Cl. .................. 525/240; 525/52; 525/53; 525/194; 525/197; 525/198; 525/211
[58] Field of Search .................. 525/52, 53, 211, 240

[56] References Cited

U.S. PATENT DOCUMENTS

| | | | |
|---|---|---|---|
| 3,035,040 | 5/1962 | Findlay | 260/94.9 |
| 3,380,978 | 4/1968 | Ryan et al. | 260/88.2 |
| 3,389,087 | 6/1968 | Kresge et al. | 252/59 |
| 3,468,979 | 9/1969 | Hamed et al. | 525/211 |
| 3,681,306 | 8/1972 | Wehmer | 260/80.78 |
| 3,790,480 | 2/1974 | Campbell et al. | 252/59 |
| 3,879,494 | 4/1975 | Milkovich et al. | 260/876 R |
| 3,884,993 | 5/1975 | Gros | 525/240 |
| 4,059,651 | 11/1977 | Smith | 260/848 |
| 4,065,520 | 12/1977 | Bailey et al. | 525/240 |
| 4,078,131 | 3/1978 | de Zarauz | 526/20 |
| 4,087,485 | 5/1978 | Huff | 260/897 A |
| 4,087,486 | 5/1978 | Fielding et al. | 260/897 A |
| 4,135,044 | 1/1979 | Beals | 526/64 |
| 4,192,935 | 3/1980 | Lovell et al. | 526/348.6 |
| 4,205,021 | 5/1980 | Morita et al. | 525/240 |
| 4,221,882 | 9/1980 | Huff | 525/240 |
| 4,251,646 | 2/1981 | Smith, Jr. | 525/88 |
| 4,259,468 | 3/1981 | Kajiura et al. | 526/283 |
| 4,363,904 | 12/1982 | Fraser et al. | 526/348.2 |
| 4,375,531 | 3/1983 | Ross | 525/93 |
| 4,414,369 | 11/1983 | Kuroda et al. | 525/65 |
| 4,429,079 | 1/1984 | Shibata et al. | 525/240 |
| 4,540,753 | 9/1985 | Cozewith et al. | 526/88 |

FOREIGN PATENT DOCUMENTS 0060609 9/1982 European Pat. Off.
70220 1/1983 European Pat. Off.

OTHER PUBLICATIONS

Mitsuda et al., "Elimation of Long Chain Branching in E-P Terpolymers . . . " Journal of Applied Polymer Science, vol. 18, pp. 193–202, (1974).

Yoshiharu Doi, Satoshi Ueki, "Block Copolymerization of Propylene and Ethylene with the Living Coordination Catalyst V(acac)$_3$/Al(C$_2$H$_5$)$_2$Cl/Anisole", pp. 225–229, Makromol. Chem., Rapid Commun. 3, 1982.

G. G. Evens and E. M. J. Pijpers, "Living Coordination Polymerization", 1981 MMI International Symposium on Transition Metal Catalyzed Polymerizations: Unsolved Problems, Aug. 17–21, 1981.

Primary Examiner—Carman J. Seccuro
Attorney, Agent, or Firm—Steven H. Markowitz; William G. Muller

[57] ABSTRACT

The present invention relates to polymeric composition of a first copolymer which includes at least one copolymer having at least one of $\overline{M}w/\overline{M}n$ less than 2 and $\overline{M}z/\overline{M}w$ less than 1.8; and a second copolymer having $\overline{M}w/\overline{M}n$ greater than or equal to 2. The composition can be produced by preparing the first and second copolymers in different reactors and blending them. The blend can also be produced in a single reactor by initiating the reaction to prepare one copolymer, and adding additional reactants, or recycling the reaction mixture, during the reaction to produce the other copolymer.

9 Claims, No Drawings

COPOLYMER COMPOSITIONS CONTAINING A NARROW MWD COMPONENT AND PROCESS OF MAKING SAME

1. Cross-Reference to Related Applications

This application is a Continuation-in-Part of application Ser. No. 840,562, filed Dec. 26, 1985 which is a Continuation-in-Part of Ser. No. 681,951 filed Dec. 14, 1984, now abandoned, which is a Continuation-in-Part of Ser. No. 504,582, filed June 15, 1983, now U.S. Pat. No. 4,540,753, (hereinafter Cozewith et al.) the disclosures of which are all incorporated by reference thereto.

BACKGROUND OF THE INVENTION

2. Field of the Invention

The invention relates to novel copolymer products, and to novel processes for producing such products. More specifically, the invention relates to blends of two copolymers, particularly ethylene propylene copolymers (EPM) or terpolymers (EPDM), one having a relatively narrow molecular weight distribution (MWD), and one having a relatively broader MWD, as well as to processes for producing such blends. The invention further relates to the use of such blends in lube oil compositions, and in elastomer preparations.

3. Description of Background Information and Relevant Materials

For convenience, certain terms that are repeated throughout the present specification are defined below:

a. Inter-CD defines the compositional variation, in terms of ethylene content, among polymer chains. It is expressed as the minimum deviation (analogous to a standard deviation) in terms of weight percent ethylene from the average ethylene composition for a given copolymer sample needed to include a given weight percent of the total copolymer sample which is obtained by excluding equal weight fractions from both ends of the distribution. The deviation need not be symmetrical. When expressed as a single number for example 15% Inter-CD, it shall mean the larger of the positive or negative deviations. For example, for a Gaussian compositional distribution, 95.5% of the polymer is within 20 wt. % ethylene of the mean if the standard deviation is 10%. The Inter-CD for 95.5 wt. % of the polymer is 20 wt. % ethylene for such a sample.

b. Intra-CD is the compositional variation, in terms of ethylene, within a copolymer chain. It is expressed as the minimum difference in weight (wt.) % ethylene that exists between two portions of a single copolymer chain, each portion comprising at least 5 weight % of the chain.

c. Molecular weight distribution (MWD) is a measure of the range of molecular weights within a given copolymer sample. It is characterized in terms of at least one of the ratios of weight average to number average molecular weight, $\overline{M}_w/\overline{M}_n$ and Z average to weight average molecular weight, $\overline{M}_z/\overline{M}_w$, where:

$$M_w = \frac{\Sigma NiMi^2}{\Sigma NiMi}$$

$$M_n = \frac{\Sigma NiMi}{\Sigma Ni}, \text{ and}$$

$$M_z = \frac{\Sigma NiMi^3}{\Sigma NiMi^2}, \text{ wherein}$$

Ni is the number of molecules of weight Mi.

d. Viscosity Index (V.I.) is the ability of a lubricating oil to accommodate increases in temperature with a minimum decrease in viscosity. The greater this ability, the higher the V.I.

Ethylene-propylene copolymers, particularly elastomers, are important commercial products. Two basic types of ethylene-propylene copolymers are commercially available. Ethylene-propylene copolymers (EPM) are saturated compounds requiring vulcanization with free radical generators such as organic peroxides. Ethylene-propylene terpolymers (EPDM) contain a small amount of non-conjugated diolefin, such as dicyclopentadiene; 1,4-hexadiene or ethylidene norbornene, which provides sufficient unsaturation to permit vulcanization with sulfur. Such polymers that include at least two monomers, e.g., EPM and EPDM, will hereinafter be collectively referred to as copolymers.

EPM and EPDM have outstanding resistance to weathering, good heat aging properties and the ability to be compounded with large quantities of fillers and plasticizers resulting in low cost compounds which are particularly useful in automotive and industrial mechanical goods applications. Typical automotive uses are tire sidewalls, inner tubes, radiator and heater hose, vacuum tubing, weather stripping and sponge doorseals and Viscosity Index (V.I.) improvers for lubricating oil compositions. Typical mechanical goods uses are for appliance, industrial and garden hoses, both molded and extruded sponge parts, gaskets and seals and conveyor belt covers. These copolymers also find use in adhesives, appliance parts, hoses and gaskets, wire and cable insulation, and plastics blends.

The efficiency of peroxide curing depends on composition. As indicated at column 2, lines 31–40 of COZEWITH et al., the "chemical" crosslinks per peroxide molecule increases as the ethylene level increases; ethylene content also affects rheological and processing properties, and the crystallinity present at very high ethylene contents may hinder processibility.

As more fully described at column 2, lines 40–49 of COZEWITH et al., milling behavior of EPM or EPDM copolymers varies radically with MWD; among the properties affected by variation in MWD is the shear rate dependence of viscosity.

A motor oil should not be too viscous at low temperatures so as to avoid serious frictional losses, facilitate cold starting and provide free oil circulation right from engine startup. On the other hand, it should not be too thin at working temperatures so as to avoid excessive engine wear and excessive oil consumption. It is most desirable to employ a lubricating oil which experiences the least viscosity change with changes in temperature.

The ability of a lubricating oil to accommodate increases in temperature with a minimum decrease in viscosity is indicated by its Viscosity Index (V.I.). The greater this ability, the higher the V.I.

EPDM or EPM polymers, or, more generally, ethylene-($C_3$–$C_{18}$) alpha-olefin copolymers, serve to impart desirable viscosity-temperature characteristics to compositions, including lubricating oils. Lubricating oil compositions which use EPM or EPDM copolymers or, more generally, ethylene-($C_3$–$C_{18}$) alpha-olefin copolymers, as V.I. improvers are well known. These additives are designed to modify the lubricating oil so that changes in viscosity occurring with variations in temperature are minimized as much as possible. Lubricating oils containing such polymeric additives essentially maintain their viscosity at higher temperatures while at the same time maintaining desirable low viscosity fluidity at engine startup temperatures.

Two important properties (although not the only required properties as is known) of these additives relate to low temperature performance and shear stability. Low temperature performance relates to maintaining low viscosity at very low temperatures, while shear stability relates to the resistance of the polymeric additives to being broken down into smaller chains.

As can be seen from the above, based on their respective properties, EPM and EPDM find many, varied uses. It is known that the properties of such copolymers which make them useful in a particular application are, in turn, determined by their composition and structure. For example, the ultimate properties of an EPM or EPDM copolymer are determined by such factors as composition, compositional distribution, sequence distribution, molecular weight, and molecular weight distribution (MWD).

It is well known that the breadth of the MWD can be characterized by the ratios of various molecular weight averages. One of such averages is the ratio of weight to number average molecular weight ($\overline{M}_w/\overline{M}_n$). Another of the ratios is the Z average molecular weight to weight average molecular weight ($\overline{MM}_z/\overline{M}_w$).

Copolymers of ethylene and at least one other alpha-olefin monomer, including EPM and EPDM polymers, which are intramolecularly heterogeneous and intermolecularly homogenous, and which have a narrow MWD, characterized as at least one of $\overline{M}_w/\overline{M}_n$ less than 2 and $\overline{M}_z/\overline{M}_w$ and less than 1.8, have improved properties in lubricating oil. Such copolymers are disclosed in COZEWITH et al., U.S. Pat. No. 4,540,753, which is incorporated herein by reference. For convenience, such polymers are hereinafter referred to as narrow MWD copolymers. Copolymers having MWD with at least one of $\overline{M}_w/\overline{M}_n$ greater than or equal to 2 or $\overline{M}_z/\overline{M}_w$ greater than or equal to 1.8 are hereinafter referred to as broad MWD copolymers.

It is generally recognized that the cure rate and physical properties of copolymers of ethylene and at least one other alpha-olefin monomer are improved as MWD is narrowed. Narrow MWD polymers have superior cure and tensile strength characteristics over such polymers having broader MWD. However, the advantages in physical properties gained from having a narrow MWD are offset by the poorer processability of such materials. They are often difficult to extrude, mill, or calendar.

As to milling behavior of EPM or EPDM copolymers, this property varies radically with MWD. Narrow MWD copolymers crumble on a mill, whereas broad MWD materials will band under conditions encountered in normal processing operations. At the shear rates encountered in processing equipment, broader MWD copolymer has a substantially lower viscosity than narrower MWD polymer of the same weight average molecular weight.

U.S. Pat. No. 3,681,306 to WEHNER, disclosed in the COZEWITH et al. patent, is drawn to a process for producing ethylene/higher alpha-olefin copolymers in at least 2 consecutive reactor stages. The preferred polymers produced are ethylene/propylene/non-conjugated diene terpolymers, the diene having only one polymerizable double bond. The preferred process uses one tubular reactor followed by one pot reactor; however, it is also disclosed that one tubular reactor can be operated at different reaction conditions to simulate two stages. As is seen from column 2, lines 14–20, the process disclosed produces polymers of broader MWD, as measured by the ratio of the weight average to number average molecular weights $\overline{M}_w/\overline{M}_n$) than those made in a single stage reactor. Although intermediate polymer produced from the first (pipeline) reactor is disclosed as having a ratio of $\overline{M}_w/\overline{M}_n$) of about 2, as disclosed in column 5, lines 54–57, the final polymers produced have an $\overline{M}_w/\overline{M}_n$) of 2.4 to 5.

U.S. Pat. No. 3,380,978 to RYAN et al. discloses a process for producing homopolymers and copolymers prepared from alpha-olefins containing 2–18 carbon atoms. In the process of this patent, a short holdup tubular reactor is employed in a first stage to produce a high molecular weight fraction having a broad molecular weight distribution, whereafter the polymer produced and remaining reaction mixture are passed directly into a second stage; in this stage, a longer holdup, constant environment autoclave reactor is employed to form a narrower molecular weight distribution fraction. It is noted that the broader MWD polymer is produced in the tubular reactor. Further, no numerical values for MWD or for molecular weight are given.

U.S. Pat. No. 3,035,040 to FINDLAY discloses a process for producing olefin polymers and copolymers from such monomers as ethylene and propylene. At least a portion of the monomers are first polymerized in the presence of a catalyst in dilute phase in a stream-line flow reaction zone. The partially polymerized admixture is subjected to further polymerization in an agitated zone to substantially complete the polymerization reaction. The first reaction zone can be an elongated tube. The second reaction zone can be an agitated tank-type reaction zone, preferably a series of stirred reactors. Polymer product can be recovered from the agitated zone effluent, with unreacted olefin and diluent being recycled to the tubular zone. There is no disclosure of difference in MWD or molecular weight between the polymers produced in the two reactors.

U.S. Pat. No. 3,884,993 to GROS discloses a process for producing EPM and EPDM rubbers which comprises producing low molecular weight and high molecular weight fractions in separate reactors, in parallel, and blending the products. Here, too, there is no mention of MWD.

SUMMARY OF THE INVENTION

It is, therefore, an object of the invention to provide novel and improved polymer products and blends, particularly of ethylene alpha-olefin copolymers.

According to the invention an ethylene alpha-olefin copolymer composition is provided which comprises:

(a) a first copolymer having at least one of $\overline{M}_w/\overline{M}_n$ less than 2 and $\overline{M}_z/\overline{M}_w$ less than 1.8; and (b) a second copolymer having $\overline{M}w/\overline{M}n$ greater than or equal to 2.

The $\overline{M}_z/\overline{M}w$ of the second copolymer is preferably greater than or equal to 1.8. Most preferably, the first copolymer has a $\overline{M}w/\overline{M}n$ of less than 2 and $\overline{M}_z/\overline{M}w$ less than 1.8.

The composition may include different amounts of the first and second copolymers, depending on the anticipated uses of the product. Thus, the composition may be formed of a major amount by weight percent of the first copolymer and a minor amount by weight percent of the second copolymer; or alternatively, by a major amount by weight percent of the second copolymer and a minor amount by weight of the first copolymer.

The first copolymer is preferably an ethylene alpha-olefin copolymer formed of monomers comprising 3-18 carbon atoms, and most preferably the alpha-olefin monomer contains 3-6 carbons. Likewise, the first copolymer is preferably such that 95 wt % of the copolymer chains of the first copolymer have an ethylene composition that differs from its average weight percent ethylene composition by 15 wt % or less, preferably 13% or less, and most preferably 10% or less.

Also, preferably in the composition of the invention 95 weight percent of the copolymer chains of the first copolymer have an ethylene composition that differs from its average weight percent ethylene composition by not more than 15 weight percent, and wherein at least 2 portions of essentially each copolymer chain of the first copolymer, each portion comprising at least about 5 weight percent of the chain, differ in composition from one another by at least about 5 weight percent ethylene, preferably at least about 10%, and most preferably by at least about 20 weight percent ethylene.

The first copolymer is an ethylene alpha-olefin copolymer. Most preferably according to the invention, the first copolymer is an ethylene propylene copolymer, or an ethylene alpha-olefin terpolymer, most preferably the first copolymer is an ethylene propylene terpolymer.

The ethylene propylene terpolymer may comprise a non-conjugated diene which is most preferably selected from the group consisting of: ethylidene norbornene, 1,4-hexadiene, dicyclopentadiene, vinyl norbornene, and methylene norbornene, and mixtures thereof.

Alternatively, the first copolymer may comprise a termonomer containing a functional group. In this instance the functional group is preferably selected from the group consisting of: hydroxy, carboxy, amino, pyridyl, amido, imido and mixtures thereof.

According to yet another alternative the first copolymer may comprise a termonomer selected from the group consisting of olefinic chlorosilanes, olefinic hydrocarbon halides and mixtures thereof.

Preferably, the first and second copolymers are copolymers of essentially the same monomers of the types recited above.

According to the invention, the inventive compositions may be used in lubricating oil compositions which comprise a lubricating oil and an amount of the copolymer composition effective to improve the viscosity index of the lubricating oil composition. Preferably, the copolymer composition is present in an amount of 0.1-5 wt % of the total lubricating oil composition.

In an ancillary approach, the inventive composition may be added to a lubricating oil concentrate so that the concentrate comprises a lubricating oil and 5-50 wt % of the copolymer composition.

Furthermore, the inventive composition gives improved processability with good vulcanizability. Therefore, the compositions can be advatageously cured.

The invention is likewise directed to a process of producing an ethylene alpha-olefin copolymer composition comprising forming a blend of a first copolymer having at least one of $\overline{M}_w/\overline{M}_n$ less than 2 and $\overline{M}_z/\overline{M}_w$ less than 1.8; and a second copolymer having $\overline{M}_w/\overline{M}_n$ greater than or equal to 2.

The first copolymer must preferably be formed under carefully conrolled conditions which may be performed in a tubular reactor or a batch reactor. Conversely, it would be impractical if not impossible to form the first copolymer in a continuous flow stirred tank reactor.

Thus, in one embodiment of the invention, the process is performed by forming the first copolymer in a mix-free tubular reactor from essentially transfer agent free reaction mixture comprising catalyst for generating essentially one catalyst species, in a manner and under conditions sufficient to initiate propagation of all copolymer chains of the first copolymer simultaneously.

The first copolymer may be formed in the mix-free tubular reactor, with a catalyst having a life longer than the residence time in the tubular reactor. In such a case, a portion of the chains growing in the first reactor is then reacted in a stirred tank reactor with additional monomer, and optionally chain transfer agent, to form the second copolymer.

In yet another embodiment the second copolymer is separately formed in a continuous flow stirred tank reactor operated in parallel with the tubular reactor, and the first and second copolymers are then blended.

Alternatively, the second copolymer is separately formed in a tubular reactor operated in parallel with the tubular reactor in which the first copolymer is formed, and the first and second polymers are then blended. In this embodiment the second copolymer is formed in a tubular reactor, but under conditions which give the second copolymer a relatively broad molecular weight distribution.

In yet another embodiment the second copolymer is formed by injecting a catalyst and optionally additional monomer at at least one location along the tubular reactor under conditions that give a relatively broad MWD to form the second copolymer.

Alternatively, the second copolymer may be formed by injecting a transfer agent, and optionally additional catalyst and monomer at at least one location along the tubular reactor to form the second copolymer.

The chain transfer agent according to the invention may be selected from the group consisting of: hydrogen, diethyl zinc, diethyl aluminum chloride, and mixtures thereof.

According to yet another approach of forming the first and second copolymers in the tubular reactor, the second copolymer is formed first in the tubular reactor from a reaction mixture with a catalyst adapted to form the second copolymer. A catalyst adapted to form the first copolymer is then injected at at least one location along the tubular reactor, together with optional additional monomer. The unreacted monomer together with optionally added monomer is then reacted to form the first copolymer.

In yet another possible embodiment, the second copolymer has a longer initiation time than the first copolymer and is initiated in the tubular reactor while the first copolymer is being formed. In this embodiment the tubular reactor is only mix-free for the first copolymer, with the second copolymer chains being initiated over a period of time, at least during part of which tubular reactor conditions are not mix-free.

The second copolymer may alternatively be formed in the tubular reactor by recycling a portion of the first copolymer formed in the tubular reactor from the reactor outlet to a point along the tubular reactor to form the second copolymer.

The two copolymers may be formed serially in the tubular reactor by forming the first copolymer in the tubular reactor in a reaction catalyzed by means of a catalyst having a shorter life than the residence time in the tubular reactor, and adding catalyst reactivator and optionally additional monomer to the tubular reactor downstream of the inlet to form the second copolymer.

According to yet another embodiment the second copolymer is formed by injecting additional reaction mixture at at least one point along the tubular reactor such that the polymerization conditions downstream of this point have the effect of forming the second copolymer of broader MWD.

As noted above, the first copolymer may be formed in a batch reactor operated under conditions to give the desired narrow MWD. As above, using this approach a number of different processes may be performed.

Thus, the first copolymer may be formed in a mix-free batch reactor from transfer agent-free reaction mixture comprising essentially one catalyst species, in a manner and under conditions sufficient to initiate propagation of all copolymer chains of the first copolymer simultaneously.

The first copolymer may be formed in the mix-free batch reactor. Then, the first copolymer is blended with a broad MWD copolymer formed in a continuous flow stirred tank recator.

Alternatively, the second copolymer may be separately formed in a batch reactor separate from the batch reactor in which the first copolymer is formed, with the first and second copolymers then being blended.

In yet another possible embodiment, the second copolymer has a longer initiation time than the first copolymer and is initiated in the batch reactor while the first copolymer is being formed. In this embodiment the batch reactor is only mix-free for the first copolymer, with the second copolymer chains being initiated over a period of time, at least during part of which reactor conditions are not mix-free.

According to yet another embodiment, the second copolymer is initiated over a time period which partially overlaps the initiation of the first copolymer in the batch reactor from reaction mixture by means of a catalyst selected to form the second copolymer.

In yet another approach, a portion of the first copolymer, regardless of how they are formed, is cross-linked to form the second copolymer, such as by nodularizing a portion of the chains by cross-linking of coupling agents in the polymer chains. Nodularizing is explained in U.S. patent application 681,950 and its continuation-in-part, Ser. No. 813,511, filed Dec. 26, 1985.

In another technique, the broad MWD copolymer is formed in a mix-free tubular reactor by periodically varying the feed or catalyst concentration so as to operate the reactor in a non-steady state thus forming the second copolymer, and subsequently operating at constant feed and catalyst conditions to produce the first copolymer. The first and second copolymers are then blended.

In a most preferred embodiment the copolymer composition of first and second copolymers may be formed by:

I. forming the first copolymer from a first reaction mixture comprised of catalyst, ethylene, and at least one other alpha-olefin monomer, comprising conducting the polymerization of the first copolymer:

(a) in at least one mix-free reactor;
(b) with essentially one active catalyst species;
(c) using at least one reaction mixture which is essentially transfer-agent free;
(d) in such a manner and under conditions sufficient to initiate propagation of essentially all of the copolymer chains simultaneously, wherein first copolymer chains are dispersed within the first reaction mixture; and II. reacting a second reaction mixture to produce a second copolymer having $\overline{M}w/\overline{M}n$ greater than or equal to 2; and blending the first copolymer and the second copolymer to produce the copolymer composition.

As above, the preferred technique of forming the first copolymer may be performed in a tubular or batch reactor, with the various alternative techniques discussed above being possible.

The invention is also directed to a composition comprising a cured ethylene alpha-olefin copolymer composition, as well as to a process of producing a cured ethylene alpha-olefin composition which comprises the steps of:

(a) forming a blend of a first copolymer having at least one of $\overline{M}w/\overline{M}n$ less than 2 and $\overline{M}z/\overline{M}w$ less than 1.8; and a second copolymer having $\overline{M}w/\overline{M}n$ greater than or equal to 2; and
(b) curing the blend.

In a more preferred fashion, the invention is directed to a process for producing a cured copolymer composition of first and second copolymers by:

I. forming the first copolymer from a first reaction mixture comprised of catalyst, ethylene, and at least one other alpha-olefin monomer, comprising conducting the polymerization of the first copolymer:

(a) in at least one mix-free reactor;
(b) with essentially one active catalyst species;
(c) using at least one reaction mixture which is essentially transfer-agent free;
(d) in such a manner and under conditions sufficient to initiate propagation of essentially all of the copolymer chains simultaneously, wherein first copolymer chains are dispersed within the first reaction mixture;

II. reacting a second reaction mixture to produce a second copolymer having $\overline{M}w/\overline{M}n$ greater than or equal to 2; and blending the first copolymer and the second copolymer to produce a copolymer composition; and III. curing the copolymer composition.

The composition of the invention may include more than one of either or both of the first and second copolymers. Likewise, more than one of either or both of the first and second copolymers may be produced in the process of the invention.

DESCRIPTION OF PREFERRED EMBODIMENTS

The present invention is considered to be most preferred in the context of EPM and EPDM copolymers, and will therefore be described in detail in the context of EPM and/or EPDM.

The narrow MWD copolymer in accordance with the present invention is preferably made in a tubular or batch reactor operating under carefully controlled conditions.

As indicated in COZEWITH et al. at column 7, lines 4–36, when a tubular reactor is employed with monomer feed only at the tube inlet, ethylene will be preferentially polymerized. The result is copolymer chains with progressively lower ethylene and higher propylene concentration, as schematically presented below:

This resulting chain is intramolecularly heterogenous.

As indicated at column 7, lines 37-48, where more than two monomers are used in the production of the narrow and broader MWD copolymers, as in the production of EPDM, all properties related to homogeneity and heterogeneity will refer to the relative ratio of ethylene to the other monomers in the chain. Further, as earlier indicated, the property related to intramolecular compositional dispersity shall be referred to as Intra-CD, and the property related to intermolecular compositional dispersity shall be referred to as Inter-CD.

The preferred copolymers for the narrow MWD copolymer of the invention are comprised of ethylene and at least one other alpha-olefin. It is believed that such alpha-olefins may include those containing 3 to 18 carbon atoms, e.g., propylene, butene-1, pentene-1, etc. Alpha-olefins of 3 to 6 carbons are preferred due to economic considerations. The most preferred copolymers for the narrow MWD copolymer are those comprised of ethylene and propylene, or of ethylene, propylene and diene.

As is well known to those skilled in the art, copolymers of ethylene and higher alpha-olefins such as propylene often include other polymerizable monomers. Typical of these other monomers may be non-conjugated dienes such as the following non-limiting examples:

a. straight chain acyclic dienes such as: 1,4-hexadiene; 1,6-octadiene;
b. branched chain acyclic dienes such as: 5-methyl-1,4-hexadiene; 3,7-dimethyl-1,6-octadiene; 3,7-dimethyl-1,7-octadiene and a mixed isomers of dihydromyrcene and dihydroocimene;
c. single ring alicyclic dienes such as: 1,4-cyclohexadiene; 1,5-cyclooctadiene; and 1,5-cyclododecadiene; cyclododecadiene;
d. multi-ring alicyclic fused and bridged ring dienes such as: tetrahydroindene; methyltetrahydroindene; dicyclopentadiene; bicyclo-(2,2,1)-hepta-2,5-diene; alkenyl, alkylidene, cycloalkenyl and cycloalkylidene norbornenes such as 5-methylene-2-norbornene (MNB), 5-ethylidene-2-norbornene(ENB), 5-(4-cyclopentenyl)-2-norbornene; 5-cyclohexylidene-2-norbornene.

Of the non-conjugated dienes typically used to prepare these copolymers, dienes containing at least one of the double bonds in a strained ring are preferred. The most preferred diene is 5-ethylidene-2-norbornene (ENB). The amount of diene (wt. basis) in the copolymer could be from about 0% to 20% with 0% to 15% being preferred. The most preferred range is 0% to 10%.

As already noted, the most preferred copolymer for the narrow MWD copolymer is ethylene-propylene or ethylene-propylene-diene. In either event, the average ethylene content of the copolymer could be as low as about 10% on a weight basis. The preferred minimum is about 25%. A more preferred minimum is about 30%. The maximum ethylene content could be about 90% on a weight basis. The preferred maximum is about 85%, with the most preferred being about 80%.

The molecular weight of the narrow MWD copolymer can vary over a wide range. It is believed that the weight average molecular weight could be as low as about 2,000. The preferred minimum is about 10,000. The most preferred minimum is about 20,000. It is believed that the maximum weight average molecular weight could be as high as about 12,000,000. The preferred maximum is about 1,000,000. The most preferred maximum is about 750,000.

The molecular weight distribution (MWD) of the narrow MWD copolymer is very narrow, as characterized by at least one of a ratio of $\overline{M}_w/\overline{M}_n$ less than 2 and a ratio of $\overline{M}_z/\overline{M}_w$ of less than 1.8. As relates to EPM and EPDM, some typical advantages of such copolymers having narrow MWD are greater resistance to shear degradation, and when compounded and vulcanized, faster cure and better physical properties than broader MWD materials. Particularly for oil additive applications, the preferred copolymers have $\overline{M}_w/\overline{M}_n$ less than about 1.6, with less than about 1.4 being most preferred. The preferred $\overline{M}_z/\overline{M}_w$ is less than about 1.5, with less than about 1.3 being most preferred.

The narrow MWD copolymer is produced by polymerization of a reaction mixture comprised of catalyst, ethylene and at least one additional alpha-olefin monomer. Solution polymerizations are preferred.

Any known solvent for the reaction mixture that is effective for the purpose can be used in conducting such solution polymerizations. For example, suitable solvents are hydrocarbon solvents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Most preferred are $C_{12}$ or lower, straight chain or branched chain hydrocarbons, particularly hexane. Nonlimiting illustrative examples of solvents are butane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane.

The composition of the narrow and broader MWD copolymers of the present invention can vary between chains as well as along the length of the chain. It is preferable to minimize the amount of interchain variation, which, as indicated, is measured by Inter-CD. Inter-CD is characterized by the fraction and total composition differences as more fully explained at column 7, lines 49-64 of COZEWITH et al., and is measured by techniques using solvent compositions, as also more fully described in this portion of the patent.

It is preferred that the Inter-CD of the copolymer is such that 95 wt. % of the copolymer chains have an ethylene composition that differs from the copolymer average weight percent ethylene composition by 15 wt. % or less. The preferred Inter-CD is about 13% or less, with the most preferred being about 10% or less.

It is also preferred that the Intra-CD of the narrow MWD copolymer be such that at least two portions of an individual, intramolecularly heterogeneous chain, each portion comprising at least 5 weight percent of the chain, differ in composition from one another by at least 5 weight percent ethylene. The Intra-CD can be such that at least two portions of copolymer chain differ by at least 10 weight percent ethylene. Differences of at least 20 weight percent, as well as of at least 40 weight percent ethylene, are also considered to be in accordance with the present invention.

Intra-CD for the narrow MWD copolymer is established by an experimental procedure wherein Inter-CD is first established as previously discussed, and the polymer chain is then broken into fragments along its contour, whereupon the Inter-CD of the fragments is determined. The difference in the two results is due to Intra-CD, as more fully represented at the illustrative example at column 8, line 33 through column 9, line 31 of COZEWITH et al.

In order to determine the fraction of a polymer which is intramolecularly heterogenous in a mixture of polymers combined from several sources, the mixture must be separated into fractions which show no further heterogeneity upon subsequent fractionation. These fractions are subsequently fractured and fractionated to reveal which are heterogeneous.

The properties of the required fragments, and the necessary fractionation techniques, are described in detail at column 9, line 39 through column 10, line 38 of COZEWITH et al.

Ethylene content for the narrow MWD copolymer can be measured by ASTM tests, and proton and carbon 13 nuclear magnetic resonance, as more fully described at column 10, lines 39-54 of COZEWITH et al.

Molecular weight and molecular weight distributions can be measured by chromatography techniques, and numerical analyses are performed by computer, as more fully described at column 10, line 55 through column 11, line 8 of COZEWITH et al.

The polymerization process for producing the narrow MWD copolymer should be conducted such that:
a. the catalyst system produces essentially one active catalyst species,
b. the reaction mixture is essentially free of chain transfer agents, and
c. the polymer chains are essentially all initiated simultaneously, which is at the same time for a batch reactor or at the same point along the length of the tube for a tubular reactor.

The narrow MWD copolymer may be produced in a mix-free reactor system, which is one in which substantially no mixing occurs between portions of the reaction mixture that contain polymer chains initiated at different times. A suitable process, as disclosed in COZEWITH et al., employs a tubular reactor with a catalyst system that gives essentially one active catalyst species, selecting polymerization conditions such that all the polymer chains are initiated at the reactor inlet, and chain transfer is substantially absent along the tube length.

As disclosed in COZEWITH et al., a single continuous flow stirred tank reactor (CFSTR) will mix polymer chains initiated at different times, and is therefore not suitable for producing the narrow MWD copolymer. However, it is well known that 3 or more stirred tanks in series with all of the catalyst fed to the first reactor can approximate the performance of a tubular reactor. Accordingly, such tanks in series are considered to be in accordance with the present invention, and fall within the term "tubular" as used herein.

Another suitable reactor is a batch reactor, preferably equipped with adequate agitation, to which the catalyst, solvent, and monomer are added at the start of the polymerization. The charge of reactants is then left to polymerize for a time long enough to produce the desired product. For economic reasons, a tubular reactor is preferred to a batch reactor for performing the processes of this invention.

The temperature of the narrow MWD reaction mixture should also be kept within certain limits. The temperature at the reactor inlet should be high enough to provide complete, rapid chain initiation at the start of the polymerization reaction. The length of time the reaction mixture spends at high temperature must be short enough to minimize the amount of undesirable chain transfer and catalyst deactivation reactions.

Temperature control of the narrow MWD reaction mixture, as described more fully in the COZEWITH et al. patent, is maintained by using prechilled feed and operating the reactor adiabatically. As an alternative to feed prechill, a heat exchanger, as more fully described in the COZEWITH et al. patent, may be employed. Well known autorefrigeration techniques may be used in the case of batch reactors or multiple stirred reactors in series.

If adiabatic reactor operation is used, the inlet temperature of the reactor feed could be about from $-50°$ C. to $150°$ C. It is believed that the outlet temperature of the reaction mixture could be as high as about $200°$ C. The preferred maximum outlet temperature is about $70°$ C. The most preferred maximum is about $50°$ C.

Certain reaction parameters for the process of producing the narrow MWD copolymer, such as preferred maximum copolymer concentration at the reactor outlet, flow rate of the reaction mixture, and residence time of the reaction mixture in the mix-free reactor for the process of making the narrow MWD copolymer, are more fully described at column 17, line 57 through column 18, line 23 of COZEWITH et al.

Briefly as to these parameters, the most preferred maximum polymer concentration at the reactor outlet is 15wt/100wt diluent, with a preferred minimum of 2wt/100wt diluent, and a most preferred minimum of at least 3wt/100wt diluent. As to residence time, a preferred minimum is about 10 seconds, and a most preferred minimum is about 15 seconds; the maximum could be as high as about 3,600 seconds, with a preferred maximum of about 1,800 seconds, and a most preferred maximum of about 900 seconds. The flow rate should be high enough to provide good mixing of the reactants in the radial direction and minimize mixing in the axial direction.

Additional solvents and reactants may be added along the length of a tubular reactor, or during the course of polymerization in a batch reactor.

In the process for making the narrow MWD copolymer, it is essential that the polymer chains are all initiated simultaneously.

In addition to the disclosed reactor systems, others having the benefit of the present disclosure may be employed. Further, more than one reactor could be used in parallel, or in series with a multiple monomer feed.

Accordingly, processes for producing the narrow MWD copolymer in accordance with the present invention are carried out:

(a) in at least one mix-free reactor,
(b) using a catalyst system that produces essentially one active catalyst species,
(c) using at least one reaction mixture which is essentially transfer agent-free, and
(d) in such a manner and under conditions sufficient to initiate propagation of essentially all polymer chains simultaneously.

Any of the process means disclosed in the COZEWITH et al. patent, using the reaction components, parameters, additives, and apparatus also disclose therein, may be employed to produce the narrow MWD copolymer. The $\overline{M}_w/\overline{M}_n$ value of this copolymer will be less than 2.0, and as low as 1.2–1.5.

As more fully described at column 13, line 64 through column 14, line 25, the catalyst used in the process for producing the narrow MWD copolymer should preferably be such as to yield essentially one active catalyst species in the reaction mixture. As also more fully discussed at this portion of COZEWITH et al., additional active catalyst species can be present which produce as much as 35% by weight of the total copolymer, but preferably less than 10% or less by weight of the copolymer, if only the narrow MWD polymer is to be formed. Accordingly, where only the narrow MWD polymer is to be formed the one active species should provide for at least 65%, or preferably at least 90%, of the total copolymer produced.

Techniques for measuring the activity of and for characterizing catalyst species are discussed at column 14, lines 14–25 of COZEWITH et al.

The catalyst systems employed in producing the narrow MWD copolymer may be those disclosed in the COZEWITH et al. patent, prepared as disclosed in this patent.

Catalyst systems to be used in carrying out processes for producing the narrow MWD copolymer may be Ziegler catalysts, which may typically include:
(a) a compound of a transition metal, i.e., a metal of Groups I-B, III-B, IVB, VB, VIB, VIIB and VIII of the Periodic Table, and (b) an organometal compound of a metal of Groups I-A, II-A, II-B and III-A of the Periodic Table.

The preferred catalyst system in practicing processes in accordance with the present invention comprises hydrocarbon-soluble vanadium compound in which the vanadium valence is 3 to 5 and organo-aluminum compound, with the proviso that the catalyst system yields essentially one active catalyst species as described above. At least one of the vanadium compound/organo-aluminum pair selected must also contain a valence-bonded halogen.

In terms of formulas, vanadium compounds useful in practicing processes in accordance with the present invention could be:

 (1)

where
X=0–3 and R=a hydrocarbon radical;
VCl$_4$;
VO(AcAc)$_2$,
where AcAc=acetyl acetonate;
V(AcAc)$_3$;

VOCl$_x$(AcAc)$_{3-x}$, (2)      (2)

where x=1 or 2;
VCl$_3$.nB, and mixtures thereof
where n=2–3 and B=Lewis base capable of making hydrocarbon-soluble complexes with VCl$_3$, such as tetrahydrofuran, 2-methyl-tetrahydrofuran and dimethyl pyridine.

In formula 1 above, R preferably represents a C$_1$ to C$_{10}$ aliphatic, alicyclic or aromatic hydrocarbon radical such as ethyl (Et), phenyl, isopropyl, butyl, propyl, n-butyl, i-butyl, hexyl, cyclohexyl, octyl, naphthyl, etc. Non-limiting, illustrative examples of formula (1) compounds are vanadyl trihalides, alkoxy halides and alkoxides such as VOCl$_3$ VOCl$_2$(OBu) where Bu=butyl, and VO(OC$_2$H$_5$)$_3$. The most preferred vanadium compounds are VCl$_4$, VOCl$_3$, and VOCl$_2$(OR).

As already noted, the co-catalyst is preferably an organo-aluminum compound. In terms of chemical formulas, these compounds could be as follows:

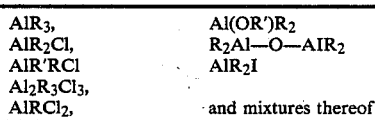

where R and R' represent hydrocarbon radicals, the same or different, as described above with respect to the vanadium compound formula.

A preferred organo-aluminum compound is Al$_2$R$_3$Cl$_3$.

The most preferred organo-aluminum co-catalyst is ethyl aluminum sesquichloride (EASC)—Al$_2$Et$_3$Cl$_3$.

Where the catalyst system used in producing the narrow MWD copolymer comprises VCl$_4$ and Al$_2$R$_3$Cl$_3$, preferably where R is ethyl, the mole ratio of aluminum/vanadium, as more fully described at column 15, lines 37–54 of COZEWITH et al., should be at least 2, with a preferred minimum of about 4, and a maximum of about 25, a preferred maximum of about 17, and a most preferred maximum of about 15.

The catalyst system can be selected, and the reactor temperature set, so that negligible chain transfer with aluminum alkyl or propylene occurs along the reactor length. Essentially all chain growth must start near the catayslt feed point. These requirements can be met with catalyst systems containing EASC.

The catalyst components are preferably premixed, as is described in the COZEWITH et al. patent in more detail, and aged prior to introduction into the reactor. The preferred minimum aging period is about 0.1 second. More preferably, this period is about 0.5 seconds; most preferably, about 1 second. The maximum aging period is about 200 seconds, or, more preferably, about 100 seconds. Most preferably, this period is about 50 seconds.

The premixing can be performed at temperatures of 40° C. or below More preferably, premixing is performed at 25° C. or below; most preferably, at 15° C. or below.

No restrictions apply to processes for producing the broader MWD copolymer which are well known. This process can be practiced with a variety of catalyst systems and polymerization conditions, provided that the desired quantity and molecular weight of polymer is obtained. The same monomers, solvents, and catalysts as disclosed for producing the narrow MWD copolymer may be used to produce the broader MWD copolymer. Reaction parameters may be varied to produce the broader MWD of this copolymer. Such reaction perameters which may be varied are temperature at the inlet and/or outlet of the reactor, as well as through the body of the reactor.

Chain transfer agents such as hydrogen or diethyl zinc, as disclosed in the COZEWITH et al. patent, may be added to the process to broaden MWD.

MWD may also be broadened by catalyst deactivation, as disclosed in the COZEWITH et al. patent.

MWD may further be broadened by adding diethyl aluminum chloride (DEAC) to the reaction.

The broader MWD copolymer may be prepared in a tubular reactor or in a stirred tank. The stirred tank may be a continuous flow stirred tank reactor (CFSTR).

According to one novel process for producing the product of this invention, a first reactor or reactors operating at conditions chosen to produce the narrow MWD copolymer can be operated in series or in parallel with a second reactor operating to produce the broader MWD copolymer. The second tubular reactor can be separate from the first reactor, or it can be an extension thereof, as long as the correct polymerization conditions are imposed.

When the second reactor is a continuous flow stirred reactor, typical operating conditions are a temperature of 20°-70° C. and a residence time of 5-60 minutes. The exit polymer concentration from this reactor is preferably in the range of 2 wt/100wt diluent to 20 wt/100 wt diluent. Any of the catalyst systems disclosed earlier can be used in the second reactor to form the second polymer. It is well known in the art that the choice of catalyst components used in a continuous flow stirred reactor influences the MWD of the polymer produced. By proper selection of the catalyst a second polymer with $\overline{M}w/\overline{M}n$ between 2 and 100 can be obtained.

A lubricating oil in accordance with the present invention comprises a major amount of basestock lubricating oil (lube oil) of lubricating viscosity which contains an effective amount of the polymer blend of the invention as viscosity index improver. The polymer blend can also be incorporated in an oil additive concentrate composition.

The polymer blend of the invention may be employed as viscosity index improvers or viscosity modifiers in lubricating oils in amounts varying broadly from about 0.001 to 50/wt. %. The proportions most suitable for a particular oil or concentrate depend upon the nature of the oil or concentrate and its specific purpose. The composition is preferably present in an amount of 0.1-5% of the total lubricating oil composition. When used in a lubricating oil concentrate the composition is present in an amount of 5-50% of the total. As disclosed in column 20, lines 41-61 of COZEWITH et al., the lubricating oils with which the polymer blend is typically used have a viscosity of about 2-40 centistokes (ASTM D-445) at 99° C., but lubricating oil basestocks comprised of a mixture of a hydrocarbon mineral oil and up to about 25/wt % of a synthetic lubricating oil such as esters of dibasic acids and complex esters derived from monobasic acids, polyglycols, dibasic acids, and alcohols are also considered suitable.

Such lubricating oil and oil additive concentrate compositions can contain conventional additives in amounts required to produce their normal attendant functions. Such additives include ashless dispersants, metal or over-based metal detergent additives, zinc dihydrocarbyl dithiophosphate, anti-wear additives, anti-oxidants, pour depressants, rust inhibitors, fuel economy or friction reducing additives, additional suitable conventional viscosity index improvers and viscosity modifiers, and antifoam agents, as disclosed more fully at column 20, line 62 through column 22, line 8 of COZEWITH et al.

With reference again to processes for making the narrow MWD copolymer of the present invention, it is well known that certain combinations of vanadium and aluminum compounds that can comprise the catalyst system can cause branching and gelation during the polymerization for polymers containing high levels of diene. To prevent this from happening Lewis bases such as ammonia, tetrahydrofuran, pyridine, tributylamine, tetrahydrothiophene, etc., can be added to the polymerization system using techniques well known to those skilled in the art.

The blend of narrow MWD copolymer and broader MWD copolymer can be formed by first preparing the narrow MWD copolymer in a mix free tubular reactor. This process utilizes conditions sufficient to simultaneously initiate propagation of all copolymer chains of the narrow MWD copolymer, and the reaction mixture employed comprises a catalyst for generating essentially one catalyst species having a life longer than the residence time in the reactor. Then, this narrow MWD copolymer is reacted in a stirred tank reactor with additional monomer to form the broader MWD copolymer.

The blend can also be produced by preparing the broader MWD copolymer in a second tubular reactor operated in parallel with the tubular reactor used to prepare the narrow MWD copolymer, and then blending the products.

The blend of the two copolymers can be prepared in the tubular reactor used to prepare the narrow MWD copolymer. The broader MWD copolymer of the blend can be formed by injecting a catalyst, or a transfer agent, or additional reaction mixture, at at least one location along the tubular reactor.

Where the narrow MWD copolymer comprises ethylene-propylene-coupling agent chains, the broader MWD copolymer components of the blend can be prepared by cross-linking the coupling agents to nodularize a portion of the chains, and the nodular chains are then blended with the narrow MWD chains.

Another means for forming the blend comprises first preparing the broader MWD copolymer in a tubular reactor by means of a catalyst suitable for preparing this copolymer, and then injecting a catalyst suitable for preparing the narrow MWD copolymer, and, alternatively, also injecting additional monomer, to instigate the reaction for forming the narrow MWD copolymer.

In the case where broad and narrow components are generated "simultaneously" the reactor is mix-free only for the narrow MWD catalyst component. Imitation of the broad MWD component would extend over a period of time which is comparable to chain lifetime, and may overlap at some point with initiation of the narrow MWD copolymer. Substantially no mixing occurs between portions of the reaction mixture that contain polymer chains initiated by the MWD catalyst at different times.

In the mix-free tubular reactor employed to prepare the narrow MWD copolymer, the broader MWD copolymer can be prepared by recycling a portion of the narrow MWD copolymer from the reactor outlet to a point along the reactor.

Another means for preparing the blend in a single mix-free tubular reactor is by adding, during the process for preparing the narrow copolymer, catalyst reactivator, and, optionally, additional monomers, downstream of the reactor inlet to form the broader MWD copolymer component of the blend.

The narrow MWD copolymer can be prepared in a mix-free batch reactor, utilizing conditions ssufficient to simultaneously initiate propagation of all copolymer chains of the narrow MWD copolymer. The reaction mixture employed comprises a catalyst for preparing essentially one catalyst species, and is essentially free of transfer agents.

The blend can also be formed by employing a catalyst in the batch reactor, and then adding the resulting narrow MWD copolymer to the broad MWD copolymer. The blend can also be formed by preparing the broader MWD copolymer in a batch reactor, and thereafter blending it with the first copolymer made in the batch reactor.

The narrow and broader MWD copolymers can be simultaneously formed in a single batch reactor by introducing into the reaction mixture both cataylst for generating essentially one cataylst species, to produce the narrow MWD copolymer, and by also introducing a cataylst suitable for forming the second copolymer.

EXAMPLE 1

This example illustrates the process of this invention wherein an EPDM copolymer product is recovered from the blend of the effluents from a tubular reactor and a stirred tank reactor operated in parallel.

The narrow MWD copolymer is produced in the tubular reactor, which incorporates a $\frac{3}{8}''$ diameter tube, and operates at a residence time of 30 seconds. Hexane is used as the solvent, $VCl_4$ as the catalyst, and $Al_2Et_3cl_3$ as the cocatalyst. Hexane is purified prior to use by passing over 4A molecular sieves (Union Carbide, Linde Div. FA 1/16'', pellets) and silica gel (W. R. Grace Co., Davidson Chemical Div., PA-400 20-4 mesh) to remove polar impurities which act as catalyst poisons. Gaseous ethylene and propylene are passed over hot (270° C.) CuO (Harshaw Chemical Co., C01900 $\frac{1}{4}''$ spheres) to remove oxygen followed by molecular sieve treatment for water removal and are then combined with the non-conjugated diene, 5-ethylidene-2-norbornene (ENB) and hexane upstream of the reactor and are passed through a chiller which provides a low enough temperature to completely dissolve the monomers in the hexane.

A catalyst solution is prepared by dissolving 55.5 g of vanadium tetrachloride, $VCl_4$, in 5.01. of purified n-hexane. The cocatalyst consists of 426 g of ethylaluminum sesquichloride, $Al_2Et_3Cl_3$, in 5.01. of purified hexane. The two solutions are premixed at 10° C. and aged for 8 seconds.

Typical feed rates and reacting conditions for the tubular reactor are shown in Table 1.

TABLE 1

|  | Tube | Stirred Tank |
| --- | --- | --- |
| Reactor Feed Temperature (°C.) | −10 | −10 |
| Reactor Outlet Temperature (°C.) | 20 | 30 |
| Reactor Feed Rates |  |  |
| Hexane (kg/hr) | 60.3 | 16.5 |
| Ethylene (kg/hr | 0.66 | 0.19 |
| Propylene (kg/hr) | 6.0 | 0.4 |
| ENB (kg/hr) | 0.1 | 0.7 |
| Vanadium (gm/hr) | 6.66 | 0.7 |

TABLE 1-continued

|  | Tube | Stirred Tank |
| --- | --- | --- |
| Aluminum (gm/hr) | 51 | 2.4 |
| Catalyst Premixing Temperature (°C.) | 10 | Not |
| Catalyst Premixing Time (sec) | 8 | Premixed |
| Total Reactor Residence Time (min) | 0.5 | 8 |
| $NH_3$ (gm/hr) | 1 | 0 |
| $H_2$ (gm/hr) | 0 | $5 \times 10^{-2}$ |

These rates are set to produce 1.65 kg/hr of terpolymer with $\overline{Mn}=60{,}000$ and $\overline{Mn}/\overline{Mn}=1.6$.

The stirred tank is operated isothermally at 20° C. with $VOCl_2(OEt)/DEAC$ catalyst at a residence time of 8 minutes to produce 0.33 kg/hr of polymer with an $\overline{Mn}$ 80,000 and $\overline{Mw}/\overline{Mn}$ equal to 6.0. Polymer composition is set to the desired level by control of the monomer ratio. Hydrogen is added to the reactor to adjust molecular weight of the polymer.

Feed ratio and reactor conditions for the stirred tank reactor are shown in Table 1.

The polymer solutions leaving the tube and stirred tank reactor are blended and the polymer recovered by standard methods. The final product has $\overline{Mn}=62{,}600$ and $\overline{Mw}/\overline{Mn}=2.57$. The physical properties are excellent and processability is good.

EXAMPLE 2

In this example a bimodal distribution is prepared by operating a tubular reactor and a stirred tank reactor in series using a long lived catalyst which produces a single species.

The tubular reactor is operated at the same conditions as in Example 1, using $VCl_4$ and a blend of EASC and DEAC (Al/v=6.5 and 3.5, respectively). The continuous flow stirred tank reactor is operated at 30° C., and is fed with effluent from the tube, additional ethylene, and diene (ENB) dissolved in a small amount of solvent. Ethylene feed rate to the stirred tank reactor is adjusted to give a polymerization rate of 0.41 kg/hr.

The tubular reactor produces a polymer with measured $\overline{Mn}=83{,}000$ and $\overline{Mw}/\overline{Mn}=1.5$, $\overline{Mz}/\overline{Mw}=1.5$. The final polymer blend has $\overline{Mn}=93{,}000$ $\overline{Mw}/\overline{Mn}=1.9$, and $\overline{Mz}/\overline{Mw}=1.8$ due to the high molecular weight broader MWD polymer made in the tank. There is a lack of low molecular weight components in the blend. The physical properties are excellent and processability is good.

EXAMPLE 3

In this example both MWD modes are made in tubular reactors. One reactor is operated without catalyst premixing to produce the broad MWD fraction.

The tubular reactor is operated at the same conditions as in Example 1, but in parallel with a second tubular reactor. The second reactor is fed with solvent and monomers chilled to −10° C. $VCl_4$ and diethyl aluminum chloride are added to the second reactor inlet in separate streams. The reactor is operated adiabatically with a residence time of 1 minute. Feed rates are set to produce 0.33 kg/hr of polymer with an $\overline{Mn}$ of 100,000 and $\overline{Mw}/\overline{Mn}$ equal p5043S02 to 3. Polymer composition is set to the desired level by control of the monomer ratio.

The polymer solutions leaving the tubes are blended and the polymer recovered by standard methods. The final product has $\overline{Mn}=64{,}000$ and $\overline{Mw}/\overline{Mn}=2.0$. The physical properties are excellent and processability is good.

EXAMPLE 4

The tubular reactor in Example 1 is operated at the same conditions as in Example 1, but with additional VOCl$_3$ added to the reactor inlet in a separate stream. This VOCl$_3$ stream is added to produce a second polymer with broad MWD. After steady state is reached, the reactor effluent is deashed, washed and stripped of solvent. The resulting polymer is a polymodal MWD EPDM. The physical properties are excellent and processability is good.

EXAMPLE 5

In this Example for producing polymodal distribution, the broader MWD copolymer component of the blend is prepared by injection of a catalyst downstream of the reactor inlet.

The tubular reactor is operated as in Example 1, except that at a point in the reactor representing 14 seconds residence time, a stream of VOCl$_3$/Et$_2$AlCl and additional ethylene, propylene and ethylidene norbornene are added to the reactor. The product contains a narrow MWD mode due to the polymer initiated at the reactor inlet, and a broad MWD polymer with several modes produced by the VOCl$_3$/Et$_2$AlCl.

EXAMPLE 6

In this example a multi-modal ethylene propylene ethylidene norbornene terpolymer is prepared by appropriate addition of a chain transfer agent.

A tubular reactor is operated as in Example 1, except that, at a point in the reactor corresponding to 15 seconds residence time, hydrogen gas is admitted to the reactor in an amount corresponding to one quarter of the molar amount of VCl$_4$ flowing into the reactor inlet along with additional monomers. The hydrogen terminates about half of the chains growing at that point, and new chains are initiated. The product polymer in the reactor effluent comprises a narrow MWD mode, which represents chains grown throughout the length of the reactor, and a broader MWD mode, which comprises chains formed as the result of hydrogen addition. Under certain conditions, the broader MWD mode may in itself be multimodal.

EXAMPLE 7

In this Example, a multimodal distribution is prepared in a tubular reactor by injection of a catalyst at the reactor inlet which produces a broad MWD polymer, and injection of a second catalyst downstream of the inlet, which produces a narrow MWD polymer. This technique can result in the narrow MWD mode being the lower MW mode.

A tubular reactor is operated with feed rates in Example 1 except that VCl$_4$ is replaced by VOCl$_3$ and the catalyst is not premixed. This catalyst feed produces a broad MWD mode. At a point representing 30 seconds residence time additional feeds are added corresponding to the total inlet feed of example 1. The reaction is permitted to proceed for another 30 seconds. The final product consists of a mixture of broad and narrow MWD polymers.

EXAMPLE 8

In this Example a single vanadium component is used with two aluminum alkyls to produce the narrow and broad MWD copolymers.

A tubular reactor is operated as in Example 1, except that VOCl$_3$ is substituted for VCl$_4$ to form a pre-mixed catalyst feed and additional separate streams of VOCl$_3$ and Et$_2$AlCl are admitted to the reactor inlet without premixing. The premixed VOCl$_3$Et$_3$Al$_2$Cl$_3$ produces a narrow MWD copolymer and the VOCl$_3$/Et$_2$AlCl react in the reactor to form a catalyst that produces a broad MWD copolymer. Both copolymers are formed simultaneously in the reactor to produce a blend of narrow and broad MWD product.

EXAMPLE 9

In this Example a portion of the reactor effluent is recycled to an upstream port on a tubular reactor, thus continuing growth of a portion of the chains and producing a broad MWD mode in addition to the narrow MWD mode.

A tubular reactor is operated as in Example 1, except that a portion of the effluent, amounting to 20% of the total volume, is recycled to a point in the reactor corresponding to 20% of the initial residence time, i.e., 6 seconds downstream from the inlet. Part of the polymer chains in the recycle stream continue to grow to higher molecular weight some low molecular weight polymers are also formed due to chains transfer reactions. The polymers produced, with respect to the recycle stream therefore comprise both high and low molecular weight modes. Thus the MWD is broad.

EXAMPLE 10

In this example, catalyst reactivator is added so as to gradually reactivate a portion of the catalyst that has died, causing new chains to form which grow various lengths of time with resultant formation of a broad MWD copolymer.

A tubular reactor is operated as in Example 1, except that the residence time is extended to 180 seconds to form the narrow MWD copolymer. Most of the active catalyst sites have terminated at the end of this time. At the point along the reactor corresponding to 180 seconds residence time, one mole of butyl perchlorocrotonate is added per mole of vanadium, and also added is additional ethylene corresonding to 50% of the initial feed. The reaction is allowed to proceed for an additional three minutes, producing a broader MWD mode.

EXAMPLE 11

In this example, a tubular reactor is operated as described in Example 1 except additional ethylene, corresponding to 25% of the amount added at the inlet, is injected, dissolved in hexane, at a point along the length corresponding to 30 seconds residence time. At this point there is a high concentration of unreacted propylene and the temperature is 50° C. due to the conditions chosen for the adiabatic operation of the reactor. The combination of temperature and propylene concentration leads to significant amounts of chain transfer and termination downstream of the injection point. Thus, the additional polymer formed is broad in MWD. The product obtained after a total residence time of 60 sec. is a combination of narrow and broad MWD copolymer.

EXAMPLE 12

In this example the feeds to the tubular reactor are varied periodically, producing product of varying molecular weights. This effluent is blended producing a mixture of narrow and broader MWD copolymers.

A tubular reactor is operated as in Example 1, with the following changes. The effluent is collected in a blending tank with a residence time of 600 seconds. The tubular reactor is operated at constant catalyst feed for 10 seconds, at which time the catalyst feed is linearly decreased, to 0.2 of its initial rate, over a period of 20 seconds. The feed is then abruptly returned to its original value, and the cycle is repeated. The period of constant feed produces a narrow MWD mode. The period of variable feed produces gradually changing molecular weights up to 5 value about 5 times the original narrow MW mode. These products, when blended, produce a product with a narrow and broader mode.

Although the invention has been discussed with reference to particular means, materials and embodiments, it is to be understood that the invention is not limited to the particulars disclosed and extends to all equivalents within the scope of the claims.

What is claimed is:

1. An ethylene alpha-olefin copolymer composition comprising:
    (a) a first copolymer having at least one of $\overline{M}_w/\overline{M}_n$ less than 2 and $\overline{M}_z/\overline{M}_w$ less than 1.8; and
    (b) a second copolymer having $\overline{M}_w/\overline{M}_n$ greater than or equal to 2, wherein said first copolymer is an ethylene alpha-olefin copolymer formed of monomers comprising 3–18 carbon atoms, wherein 95 weight percent of the copolymer chains of the first copolymer have an ethylene composition that differs from the average weight percent ethylene composition of the first copolymer by not more than 15 weight percent, and wherein at least 2 portions of essentially each copolymer chain of the first copolymer, each portion comprising at least about 5 weight percent of the chain, differ in composition from one another by at least about 5 weight percent ethylene.

2. The composition as defined by claim 1 wherein said first copolymer has a $\overline{M}_w/\overline{M}_n$ of less than 2 and $\overline{M}_z/\overline{M}_w$ less than 1.8.

3. The composition as defined by claim 1 wherein said first copolymer is an ethylene propylene terpolymer.

4. The composition as defined by claim 3 wherein the ethylene propylene terpolymer further comprises a non-conjugated diene.

5. The composition as defined by either of claims 3 wherein said first copolymer comprises a functional group containing termonomer.

6. The composition as defined in claim 1 wherein said first copolymer is an ethylene propylene copolymer.

7. The composition as defined by claim 1 wherein said first copolymer is an ethylene alpha-olefin terpolymer.

8. The composition as defined by claim 1 wherein the first copolymer is such that the average ethylene composition differs from the first copolymer's average weight percent ethylene composition by 13 percent or less.

9. The composition as defined by claim 8 wherein the first copolymer is such that the average ethylene composition differs from the first copolymer's average weight percent ethylene composition by 10 percent or less.

* * * * *